United States Patent [19]

Tanaka et al.

[11] 4,455,494
[45] Jun. 19, 1984

[54] ELECTRET DEVICE

[75] Inventors: Masamichi Tanaka, Yamato; Hiroto Wada, Yokosuka, both of Japan

[73] Assignee: Tokyo Shibaura Denki Kabushiki Kaisha, Japan

[21] Appl. No.: 500,830

[22] Filed: Jun. 3, 1983

Related U.S. Application Data

[63] Continuation of Ser. No. 280,054, Jun. 30, 1983, abandoned.

[30] Foreign Application Priority Data

Jun. 30, 1980 [JP] Japan .................................. 55-88819
Jun. 30, 1980 [JP] Japan .................................. 55-88824

[51] Int. Cl.$^3$ ............................................. G11C 13/02
[52] U.S. Cl. ................................................. 307/400
[58] Field of Search ...................... 307/400; 29/592 E; 365/146; 179/111 E

[56] References Cited

U.S. PATENT DOCUMENTS

| 3,016,481 | 1/1962 | Simpson | 307/400 |
| 3,809,828 | 5/1974 | Haugsjaa et al. | 307/400 |
| 3,812,575 | 5/1974 | Hedman | 307/400 |

FOREIGN PATENT DOCUMENTS 60792 5/1978 U.S.S.R. ............................. 307/400

OTHER PUBLICATIONS

IBM Technical Disclosure Bulletin-vol. 12, No. 7, Dec. 1969, pp. 1053-1054.

Primary Examiner—James W. Moffitt
Attorney, Agent, or Firm—Finnegan, Henderson, Farabow, Garrett & Dunner

[57] ABSTRACT

An electret device having its electric charges introduced to a remote electrode. A conductive electrode is secured to one surface of a polarized dielectric body. A cover body made of conductive material is attached to the opposite surface of the dielectric body, and a remote electrode is connected through a conductive wire to the cover body.

3 Claims, 2 Drawing Figures

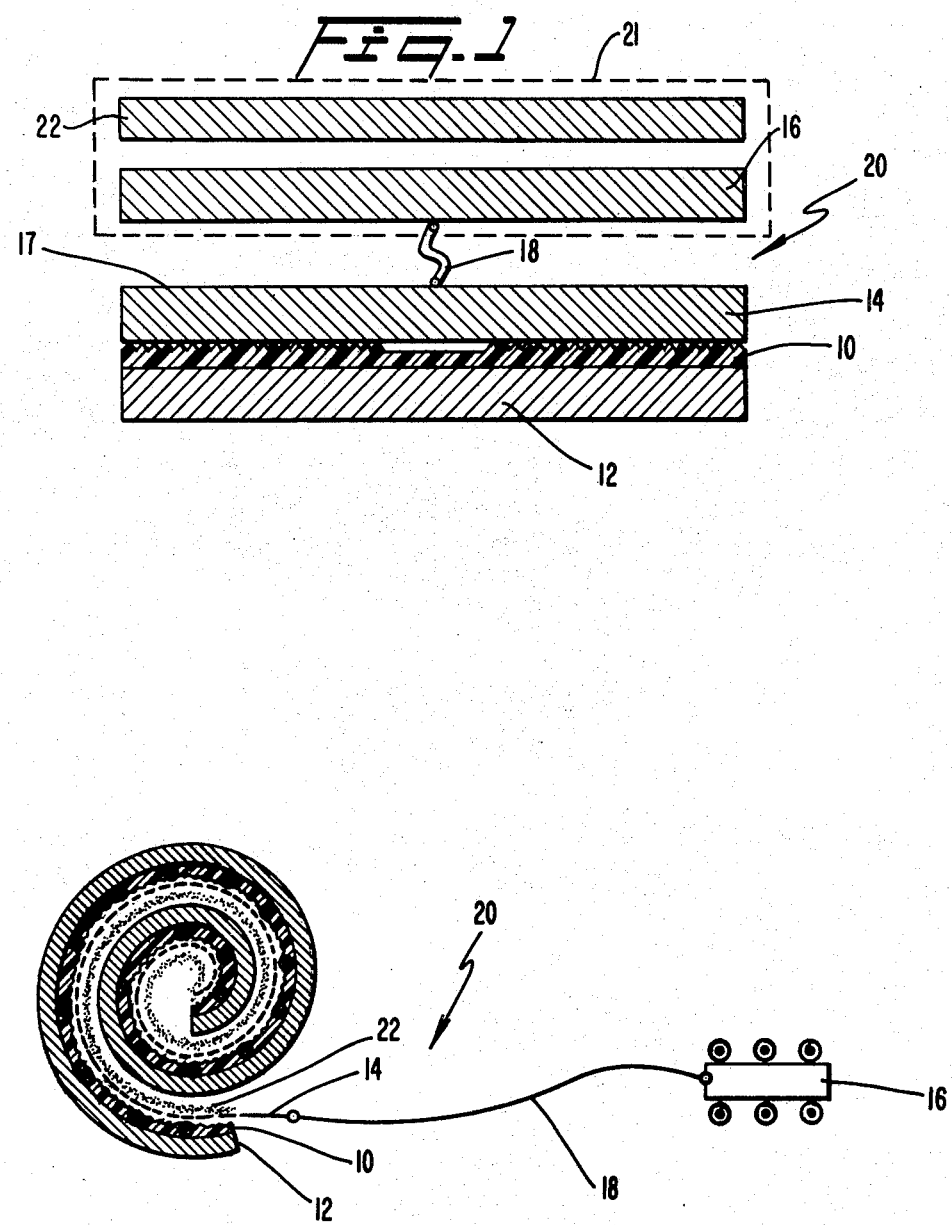

ELECTRET DEVICE

This is a continuation, of application Ser. No. 280,054, filed June 30, 1983, and now abandoned.

FIELD OF THE INVENTION

This invention relates to an electret device, more particularly, to an electret device having its electric charges introduced to a remote electrode.

BACKGROUND OF THE INVENTION

An electret is a dielectric body having a high degree of surface electric charge. The electret retains its surface electric charge for a long period of time, often measured in tens of years. The electric charge, or dielectric polarization, is achieved, for example, in one prior art process by heating a body of dielectric material to a relatively high temperature while the material is exposed to an intense electric field for a substantial period of time, and then cooling the material while maintaining its exposure to the electric field. Upon cooling, the material exhibits characteristics of a permanent charge distribution.

Electrets have many uses as a transducer in a device such as a microphone, a loudspeaker and a record disk pick-up. Moreover, it is anticipated that electrets will be used in the near future as memory units, high potential sources, measuring apparatus and the like.

Electrets comprise dielectrics which produce static electric fields having relatively long lifetimes. Their long lifetimes are primarily attributable to the development of new materials which are more stable than previously employed wax materials. Today, plastic materials such as polyethylene, polypropylene, and polyethylene terephthalate are extensively used in constructing electrets.

Conventionally, electrets are constructed in the form of electret devices in which an electret body is secured on a conductive electrode. Such electret devices have drawbacks, in that their surface charge potential is relatively low and the charge capacity at a unit surface is relatively small.

SUMMARY OF THE INVENTION

Accordingly, it is an object of the present invention to provide an electret device capable of having its electric charges introduced to a remote electrode.

Another object of the present invention is to provide an electret device having considerable charge capacity per unit surface.

A further object of the present invention is to provide an electret device having a surface charge which can be adjusted to the desired magnitude.

A still further object of the present invention is to provide an electret device which can be employed in any polarity.

To achieve the foregoing objects in accordance with the invention as embodied and broadly described herein, the electret device is comprised of a dielectric body provided with a surface electric charge, a conductive electrode secured on one surface of the dielectric body, a cover body attached on the opposite surface of the dielectric body, and a remote electrode electrically connected to the cover body.

Further objects, features and advantages of the present invention will become apparent to persons skilled in the art from a study of the following description of the accompanying drawings, in which:

BRIEF DESCRIPTION OF THE DRAWINGS:

FIG. 1 is a sectional view of an electret device constructed according to the present invention.

FIG. 2 is a sectional view of another embodiment of the electret device according to the present invention.

DESCRIPTION OF THE PREFERRED EMBODIMENT

The present invention will be described in detail with reference to the drawings (FIG. 1 and FIG. 2). Throughout the drawings, like reference numerals are used to designate like or equivalent portions, for the sake of clarity and simplicity of explanation.

FIG. 1 shows a sectional view of an electret device according to the present invention. Dielectric body 10 is formed in a flat plate-like configuration with two substantially flat and generally parallel surfaces, and is provided with a volume of electric charge. Conductive electrode 12 is secured on one flat surface of dielectric body 10. Cover body 14, made of a conductive material, is attached to the other flat surface of dielectric body 10, opposite to conductive electrode 12. Remote electrode 16 is electrically connected to cover body 14 through conductive wire 18. The combination of dielectric body 10 and conductive electrode 12 is similar to conventional electret devices.

Typically, polarization of dielectric body 10 is carried out by, for example, imposing an electrical field or applying charged particles, e.g., ions, before or after conductive electrode 12 is secured to dielectric body 10. The polarity of dielectric body 10 may be determined by the polarity of the electrical field or the charged particles.

Most dielectric materials are suitable for forming dielectric body 10 in the electret of the present invention. However, high molecular weight compounds, such as polypropylene, teflon ® (flourine-containing polymers) or polyethylene are especially suitable because the electric charge in these materials becomes relatively high in potential and is maintained for a long period of time.

Polarization of dielectric body 10 generally must be carried out after cover body 14 is attached to dielectric body 10. However, repolarization of dielectric body 10 may be achieved by applying a D.C. voltage between conductive electrode 12 and remote electrode 16.

In the electret device 20 described above, cover body 14 is polarized dielectrically under the effect of charged dielectric body 10. A positive polarity is introduced on cover body 14 at its outer surface 17 if the polarity of the surface charge of dielectric body 10 at the surface adjacent to the cover body is positive, and vice versa. That is, a polarity which is the same as the polarity of the surface charge of dielectric body 10 is introduced on cover body 14.

The charge on cover body 14 is then shifted to remote electrode 16, so that the charges appear on remote electrode 16.

The charge capacity per unit surface on remote electrode 16 may easily be adjusted by adjusting the size of remote electrode 16. Moreover, in installing electret device 20 of the present invention in an apparatus, for example, an electrostatic transducer, the combination of conductive electrode 12, dielectric body 10 and cover body 14 may be situated so as to be spaced apart from a transducing capacitor 21, with remote electrode 16 serving as the capacitor electrode together with a second capacitor electrode 22. Consequently, mechanical design of the transducer is easier.

The electret device 20 according to the present invention exhibits an exceedingly uniform surface charge at every part of the upper surface of remote electrode 16. Electret device 20 of the present invention is, therefore, very useful, due to its improved uniformity of surface charge distribution. That is, for example, transducers using electret device 20 of the present invention can provide high-fidelity transducing characteristics, since the electrostatic forces arising between electret device 20, such as one electrode of a transducing capacitor, and an opposing electrode are uniform at every part of the transducing capacitor.

FIG. 2 shows another embodiment of the electret device according to the present invention. A combination of conductive electrode 12, dielectric body 10 and cover body 14 is formed into a rolled figure. Cover body 14 is insulated from conductive electrode 12 by insulator 22. Remote electrode 16 is connected to cover body 14 through conductive wire 18. In electret device 20 of FIG. 2, a very large charge capacity is easily obtained on remote electrode 16.

What is claimed is:

1. An electret device comprising:
   a dielectric body provided with electric charges,
   a conductive electrode secured on one surface of said dielectric body,
   a cover body comprised of a conductive material and attached on the opposite surface of said dielectric body, and
   a remote electrode electrically connected to said cover body through a conductive wire, said remote electrode comprising part of a transducing capacitor responsive to physical variations, but said dielectric body not being part of said transducing capacitor.

2. An electret device according to claim 1, where said dielectric body, conductive electrode and cover body are formed into a rolled figure, and further comprising an insulator situated between said cover body and said conductive electrode.

3. An electret device comprising:
   a dielectric body provided with electric charges,
   a conductive electrode secured on one surface of said dielectric body,
   a cover body comprised of a conductive material and attached on the opposite surface of said dielectric body, and
   a transducing capacitor located remote from said dielectric body, said transducing capacitor including a remote electrode electrically connected to said cover body through a conductive wire.

* * * * *

UNITED STATES PATENT AND TRADEMARK OFFICE
CERTIFICATE OF CORRECTION

PATENT NO. : 4,455,494
DATED : June 19, 1984
INVENTOR(S) : Masamichi Tanaka et al.

It is certified that error appears in the above—identified patent and that said Letters Patent is hereby corrected as shown below:

Column 1, line 5, change "1983" to --1981--.

Signed and Sealed this

First Day of January 1985

[SEAL]

Attest:

GERALD J. MOSSINGHOFF

Attesting Officer

Commissioner of Patents and Trademarks